United States Patent [19]

Araseki et al.

[11] 4,001,505
[45] Jan. 4, 1977

[54] SPEECH SIGNAL PRESENCE DETECTOR

[75] Inventors: Takashi Araseki; Kazuo Ochiai, both of Tokyo, Japan

[73] Assignee: Nippon Electric Company, Limited, Tokyo, Japan

[22] Filed: Apr. 3, 1975

[21] Appl. No.: 564,644

[30] Foreign Application Priority Data

Apr. 8, 1974 Japan .............................. 49-39723

[52] U.S. Cl. .............................. 179/1 SC; 179/1 P; 179/1 HF
[51] Int. Cl.² ......................................... G10L 1/04
[58] Field of Search .............. 179/1 SC, 1 CN, 1 H, 179/15 AS, 1 SA

[56] References Cited

UNITED STATES PATENTS

| 3,278,685 | 10/1966 | Harper | 179/1 SC |
| 3,488,446 | 1/1970 | Miller | 179/1 SC |
| 3,507,999 | 4/1970 | Schroeder | 179/1 SC |

OTHER PUBLICATIONS

Nemeth, A. "Detection of Excitation Times ... Voice Frequency" IBM Tech. Disclosure Bull. vol. 15, No. 11, Apr. 1973.

Primary Examiner—Kathleen H. Claffy
Assistant Examiner—E. S. Kemeny

[57] ABSTRACT

A speech detector which rapidly detects the presence of speech signals in telephone channel broadband noise is useful in TASI type systems. The incoming analog speech signal is sampled and binary-coded, then fed simultaneously to two different detectors: (1) A large-amplitude threshold detector (which detects high-energy vowel and plosive sounds): (2) a high-frequency threshold detector (which detects high-frequency fricative sounds above a 2 Khz threshold, assuming inherent noise in a 4 Khz telephone channel is mostly flat/broadband and 8 Khz sampling noise is filtered out).

9 Claims, 4 Drawing Figures

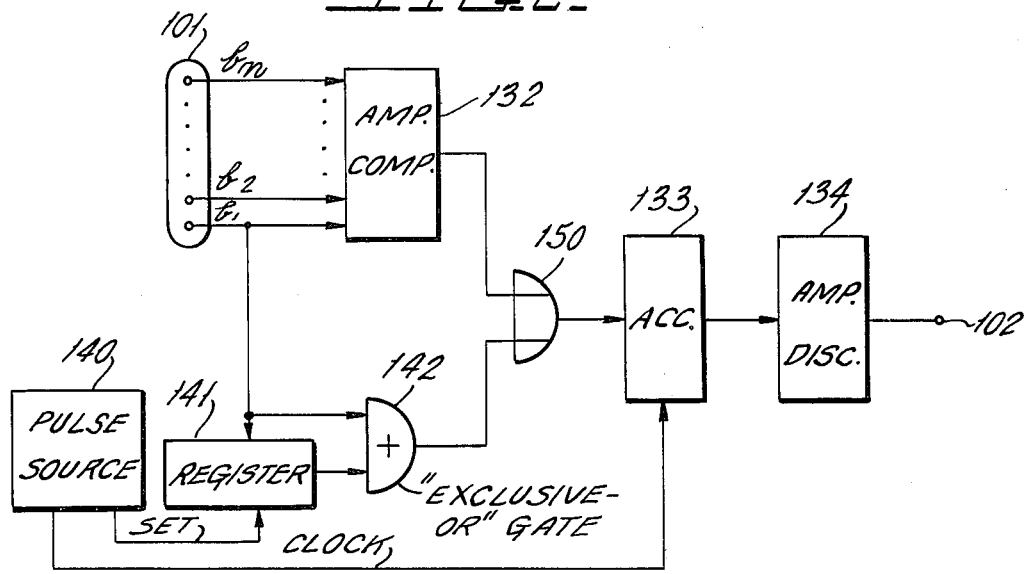
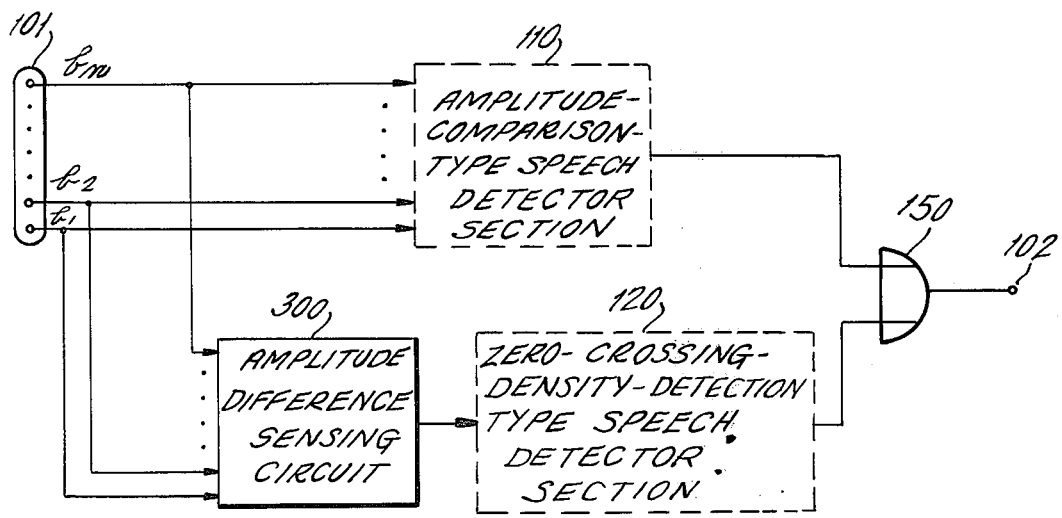

SPEECH SIGNAL PRESENCE DETECTOR

BACKGROUND OF THE INVENTION

The present invention relates to a speech detector for determining the presence or absence of voice signals on a telephone line, particularly on time-division multiplexed telephone channels.

The rapid expansion of communication networks has increased the demand for long distance communication links involving satellites and submarine cables. In order to obtain more efficient use of expensive long distance communications links, the so-called TASI (Time Assignment Speech Interpolation) system has been put into use. Also, echo suppressors are in use to suppress the echo caused by the long distance communication channels. An essential requirement for both the TASI system and the echo suppressor is the need for a high-performance speech detector. For reliable operation the response time of speech detection to the voice signal must be as short as possible. Otherwise, initial clipping is inevitable, deteriorating the conversation quality. Therefore, the demand is imminent for a high-performance speech detector capable of extremely high speed detection and low susceptibility to noise.

Most conventional speech detector circuits are of the amplitude-comparison type which relies upon the comparison of the voice signal level with a predetermined threshold voltage reference level for detection. This type of speech detection is capable of responding fairly quickly to most voice sounds and plosives. However, its performance is generally poor for fricative consonants such as (S) and (h), whose reference level sometimes becomes as low as background noise inherent in communication channels. This is due to the fact that the lowering of the threshold reference value to enhance the sensitivity contributes to the prevention of the initial clipping but aggravates the vulnerability to noise, while the raising of the threshold value results in the slowdown of speech detection response, causing the initial clipping.

To achieve a better detection of fricative consonants, attempts have been made for the parallel use of another speech detector of the periodicity detection type combined in parallel with the above-mentioned amplitude-comparison type one. The former relies for its speech detection on the fact that a voice signal has periodicity while noise does not. However, since the fricative consonants are inherently noise-like and lack sufficient periodicity, signals representing such sounds are still difficult to detect, so far as the periodicity is strictly relied on for the detection. In addition, an ordinary periodicity-detection type speech detector involves the problem of being quite complicated.

BRIEF DESCRIPTION OF THE INVENTION AND OBJECTS

It is therefore an object of the present invention to provide a speech detector which is simple in structure and which has excellent detection capability for any sounds including fricative consonants.

According to the present invention, there is provided a coded speech detector adapted to detect coded speech signals every time they are present, on time-division-multiplex telephone channels, each of the coded speech signals being composed of one binary sign bit and several binary amplitude bits representing the sign and amplitude of original analog speech signal, respectively. The detector is characterized by comprising a zero crossing density detector section, which, in turn, has means for sensing the frequency of the change in the sign bits of the voice signals, and means responsive to the output of said sensing means for delivering a detection output only when the sensed frequency exceeds a predetermined value. As will be apparent, this operation corresponds to the zero crossing density detection for uncoded analog voice signals.

As described above, what is intended is the improvement in the detection capability for fricative consonants. To achieve this, use should be made not only of the information included in the amplitude data but also of those included elsewhere. As is well known, however, the frequency components of the background noise inherent to telephone channels generally lie mainly in the low audio frequency region, while the frequency components of fricative consonants are concentrated in a relatively high audio frequency region. This difference in distribution of frequency components is the basis upon which the speech detection by the present speech detector is designed.

To describe the principle of the present invention in greater detail, the signal to be processed by the speech detector is a coded speech signal at a sampling frequency of 8 KHz, for example. More specifically, each of the input speech signals is translated into a binary signal having a single sign bit and several amplitude-representing bits for each sampled and quantized analog value. The sign bits are compared for every two successive binary codes representative of two quantized analog values. If a change in the sign bits, e.g., the change from 1 to 0 or vice versa, is present, it signifies the presence of one zero crossing in the original voice signal. Thus the detection of the change in the sign bits gives the data regarding the zero crossing density.

If a slow-changing noise component is superimposed on the speech signal to such an extent that it may affect the zero crossing, the increase or decrease of a code value with respect to an immediately preceding code is sensed to supplement the data included in the sign bits, as is well known to those skilled in the art.

On the other hand, since most of the frequency components of fricative consonants lie in the frequency region ranging from a quarter to one half of the sampling frequency, (2Khz to 4 Khz), the number of occurrences, i.e., the frequency, of the sign bit change for those fricative sounds is greater than the corresponding frequency for the background noise, whose frequency components mainly lie in the region lower than a quarter of the sampling frequency. Means is therefore provided in the present invention for producing a detection output only when the frequency of the sign bit change exceeds a prefixed value, which corresponds to a threshold value lying between those frequency regions predominantly occupied by the frequency components of the fricative consonants and those of background noise. The detection output is supplied to an OR circuit to which is applied another detection output from the conventional amplitude-comparison type speech detector. Thus, the present invention makes it possible to detect the noise-like fricative consonants as well as ordinary (i.e., non-fricative) voice sounds and the like.

BRIEF DESCRIPTION OF THE FIGURES

Now the present invention will be described in more detail with reference to the accompanying drawings, in which:

FIG. 2 is a block diagram showing a second embodiment of the present invention;

FIG. 3 is a block diagram showing a third embodiment of the present invention.

DETAILED DESCRIPTION OF THE INVENTION

Figure 1:
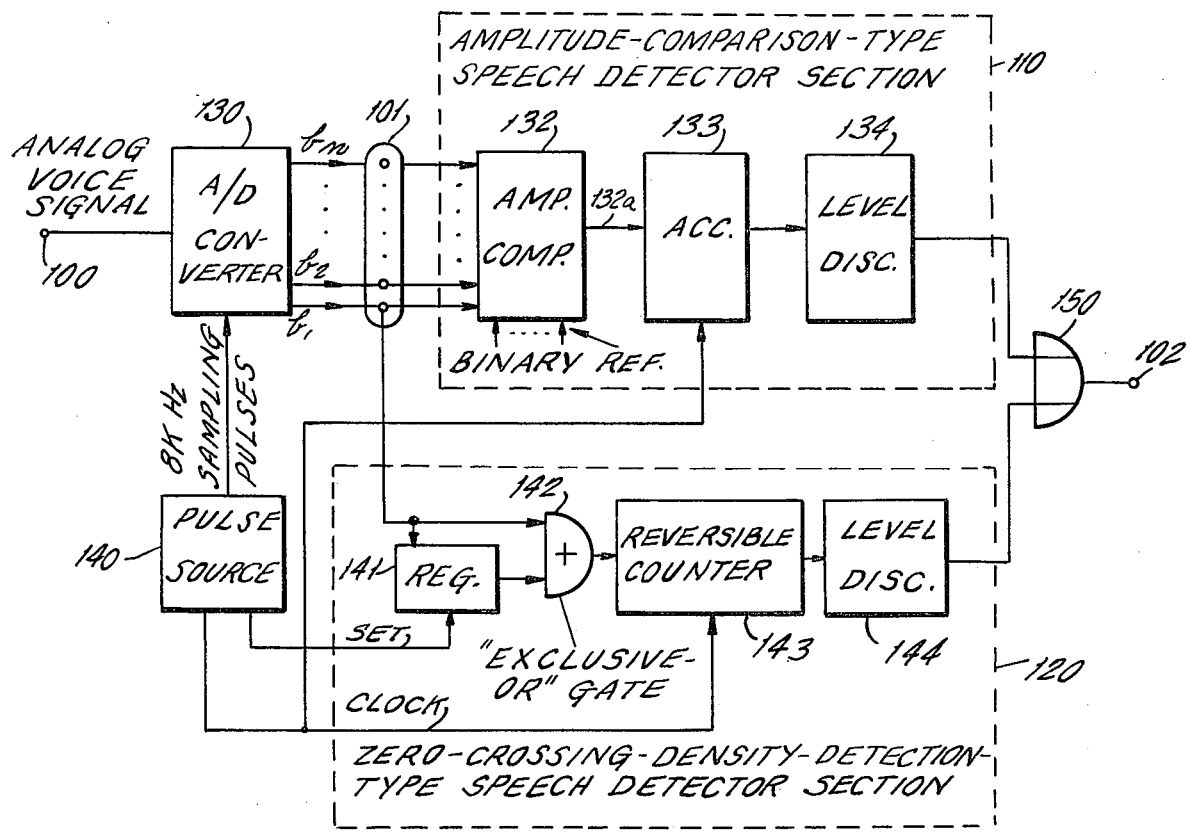
FIG. 1 shows a first embodiment of the present invention.

Referring now to FIG. 1, the first embodiment of the present invention comprises a set of input terminals 101 for parallel coded speech signals, an amplitude-comparison-type speech detector section 110, a zero-crossing-density-detection-type speech detector section 120, and a logical OR circuit 150 connected to the output side of the sections 110 and 120. To the terminal set 101 is applied from an A/D converter 130 a parallel coded speech signal composed of successive binary codes each including a sign bit $b_1$ and amplitude bits $b_2, b_3 \ldots$ and $b_n$, which represent a sampled value of an analogue speech signal supplied at an input terminal 100. A timing pulse source 140 supplies the sections 110 and 120 and the A/D converter 130 with timing pulses needed for the operations to be described hereunder. The timing pulse suppled to A/D converter 130 is an 8 KHz sampling pulse.

The amplitude-comparison-type speech detector section 110 has an amplitude comparator 132, an accumulator 133 and a level discriminator 134. At the comparator 132 the voice-representing successive parallel codes are successively compared in digital fashion with a reference binary code representing a lowest allowable analog voltage level for the input voltage to be sensed as a possible signal component. The comparator 132 therefore delivers a binary 1 signal at its output 132a every time the comparison shows that the analogue value represented by the input code is larger than the corresponding level represented by the reference binary code. The accumulator 133, to which a clock pulse of the same frequency as the 8 kHz sampling pulse is applied, responds to the output of the comparator 132 in such a fashion that a binary 1 signal may be accumulated with or without a prefixed weight imposed while a 0 may cause subtraction. The accumulated value at the accumulator 133 is monitored by the level discriminator 134, which delivers a voice detection output when the accumulated value exceeds a threshold value set therein. The level discriminator 134 may be a monostable circuit coupled to a predetermined stage of the accumulator or the like so that the accumulated value reaching said stage may be sensed.

It will be apparent from the foregoing description that the detector section 110 senses as a speech signal component only those successive binary codes which correspond to an analogue signal segment having above-the-threshold levels and distribution density. As will be apparent from the description to be given hereunder, the present invention permits several modifications. For example, the input signal may be detected as a speech signal every time the threshold level is exceeded or only when above-the-threshold values last for more than $n$ sampling periods. Alternatively, the absolute values of the input codes may be subjected to leaky integration or integration followed by level discrimination. For further details of these alternatives, reference is made to U.S. Pat. Nos. 3,712,959 and 3,644,680, and Japanese patent application No. 42185/69.

As stated above, the speech detector section 110 is effective for detecting voice sounds or plosives, but incapable of rapidly and reliably sensing fricative consonants, whose signal levels are often nearly equal to or lower than that corresponding to the reference binary code set at the amplitude comparator 132. To achieve a greater sensitivity to smaller amplitude components such as fricative sounds, and thereby avoid the initial clipping for those speech components beginning with fricative sounds, the reference level set by the above-mentioned reference binary code may be lowered. However, this involves the problem of noise being allowed to be detected along with the speech signal (by contrast, when the reference level is raised, the initial clipping is worsened).

Figure 1A:
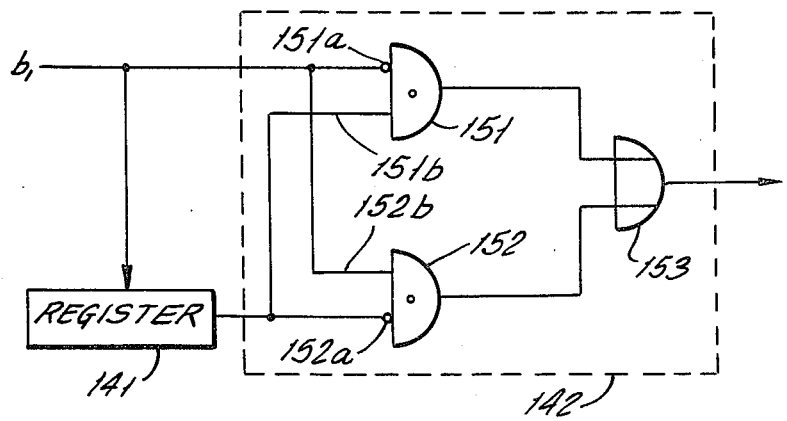
FIG. 1a shows an exclusive-OR circuit which may be utilized in the embodiment of FIG. 1.

To avoid this drawback, the zero-crossing-density-detection-type speech detector section 120 does not rely on amplitude information. Detector section 120 is comprised of a register 141, to which is supplied the sign bit $b_1$ from the terminal set 101. Also supplied to the register 141 from the timing pulse source 140 is a set pulse, which is obtained from the pulse source 140 by shifting (i.e., delaying) the clock pulse to permit the register 141 to perform a one-clock-interval registering. The output of the register 141 is connected to an Exclusive-OR circuit 142 whose other input is a sign bit itself. The register 141 causes just one-clock-interval delay. Thus, a bit-to-bit comparison is performed for every two successive sign bits. As will be apparent, the Exclusive-OR circuit 142 delivers a binary 1 at its output only when the delayed and undelayed sign bits differ. As shown in FIG. 1a the Exclusive-OR gate may, for example, comprise AND gates 151 and 152 each having one inverted input 151a and 152a and one true input 151b and 152b. The outputs of AND gates 151 and 152 are coupled to OR gate 153 to develop a 1 signal only when one or the other input (but not both) are at binary 1. Obviously any other suitable technique may be employed, if desired.

The binary output is applied to a reversible counter 143 which, when supplied with the clock pulse, does up- and down-counting, in response to the binary signals 1 and 0, respectively. The counter output is discriminated by a level discriminator 144, which assumes a binary 1 state only while the counter output is above a threshold value set at the discriminator 144 (which is similar in its structure to the amplitude discriminator 134).

As will be apparent from the foregoing description the zero-crossing-density-detection-type speech detector section 120 detects voice signal components only when the number of occurrences of the sign bit change sensed at the Exclusive-OR circuit 142 exceeds a prefixed value established by level discriminator 144.

The outputs of the detector sections 110 and 120 are coupled through the OR circuit 150 to the output terminal 102. It will now be apparent that the detection output at the terminal 102 signifies the presence not only of ordinary sounds having sufficient amplitude but of such low-amplitude level sounds of high zero-crossing density as fricative consonants. Therefore, the detector of the present invention brings about a better sensitivity to low-level fricative sounds and faster response to those sounds beginning with the fricative consonants, solving the problem of initial clipping.

In the embodiment of FIG. 1, the reversible counter 143 may be an accumulator identical in its construction and function to the accumulator 133. Needless to say, the level discriminator 144 may be identical to the discriminator 134. Also, the discrimination levels at discriminators 134 and 144 are made adjustable to adapt the detector sections 110 and 120 to varied conditions. Furthermore, the Exclusive-OR circuit may be made of any other type of non-coincidence circuit.

The above-mentioned similarity in function of the constituent elements leads to a simplified modification of the embodiment of FIG. 1. Referring to FIG. 2, in which like reference numerals are given to like structural elements, the accumulator 133 and amplitude discriminator 134 are common to the amplitude-comparison type speech detection and the zero-crossing-detection type speech detection. For this purpose, the OR circuit 150 is disposed at the stage prior to the accumulation operation so that the outputs of the amplitude comparator 132 and the Exclusive-OR circuit 142 may be coupled in common to accumulator 133. Since the amplitude components and the zero crossing density components are sensed separately at the comparator 132 and the Exclusive-OR circuit 142, this modification retains the feature of the embodiment of FIG. 1, with its construction much simplified as compared with the embodiment of FIG. 1.

As stated above, the embodiment and modification so far described have excellent response to the fricative consonants and accordingly exhibit sufficient quick response even to those sounds beginning with fricative consonants. The initial clipping, which tends to be caused for those latter-mentioned sounds, is therefore avoided.

This advantage is attained so far as the signal level represented by the incoming successive binary codes is not itself appreciably affected by noise. However, in some cases the zero crossing of the signal level is affected by noise. More definitely, when the noise level is so high as to be comparable to the fricative consonant components and when the noise predominantly has such low frequency components as may appreciably affect the zero crossings of the signal level when superimposed on the signal, the zero crossing detection of the signal itself does not yield the desired result. In addition to the background noise, the so-called d-c offset is inevitable in the analogue-to-digital conversion employed in telephone communication channels, where the zero-crossings are similarly affected. This problem is often experienced with conventional zero-crossing-periodicity-detection type speech detectors.

To avoid this problem, it is often the practice to detect, instead of the sign bit itself, just the increase or decrease of a binary code with respect to an immediately preceding code. This approach makes it possible to remove the adverse effect of the low-frequency noise components which are superimposed on the signal level to positively or negatively shift the average value of the latter. The embodiment of FIG. 3 is based on the principle stated herein.

Referring to FIG. 3, in which like reference numerals denote like structural elements, an amplitude-difference sensing circuit 300 is provided instead at the stage prior to the speech detector section 120. The sensing circuit 300 is composed of a register coupled directly with the terminal set 101 for storing the successively incoming parallel binary codes for one sampling period, and a subtractor coupled with the terminal set 101 and the register for subtracting the incoming binary code from an immediately preceding code supplied from the register. Thus, the sensing circuit 300 delivers a binary output 1 or 0 depending on the result of subtraction, 1 and 0 respectively signifying the increase and decrease in the sampled analogue value with respect to the immediately preceding one both represented by the binary codes.

As will be apparent from the foregoing description, the binary output of the sensing circuit 300 serves the same purpose as the output of the sign bit. Since the response of the detector section 120 in the embodiment of FIG. 3 to the output of the circuit 300 is identical to that of the detector section 120 of the embodiment of FIG. 1 to the sign bit, further description will be omitted here with respect to the embodiment of FIG. 3.

Although not shown in FIG. 3, the accumulator 133 and level discriminator 134 included in the speech detector section 110 may be in common with those for the other speech detector section 120 as in the modification of FIG. 2.

While two embodiments and modifications have been described above, it will be apparent that the invention is not limited thereto but includes all modifications and alternative forms falling within the scope of the appended claims.

What is claimed is:
1. A speech detector adapted to detect a speech signal on a telecommunication channel, comprising:
input means for receiving an input digital speech signal supplied in the form of successive parallel codes having a repetition rate determined by the sampling frequency for said speech signal, each of said parallel codes comprising a sign bit indicating the polarity of a coded amplitude of the speech signal and a plurality of bits representing the magnitude of the sampled analog signal;
a first speech detector section coupled to said input means for detecting the presence of said speech signal depending on the comparison of the parallel-code-represented analog value with a threshold code representing predetermined analog level;
a second speech detector section coupled to said input means in parallel with said first speech section for detecting the presence of said speech signal depending on the occurrence of a change in at least one of said sign bits and the direction in which the parallel-code-represented analogue value varies; and
an OR circuit coupled to both said first and second speech detector sections for leading their outputs to an output terminal as a voice detection output; wherein said second speech detector section comprises first means coupled with said input means for deriving at least one of said sign bit changes and direction changes in the parallel-code-represented analog value to deliver a first binary output, second means coupled with said first means responsive to said first binary output to deliver a second binary output every time said first binary output has two successive different binary digits, third means for accumulating said second binary output, and fourth means coupled with said third means for delivering a third binary output every time the accumulated value at said third means exceeds a first threshold value, and wherein the output of said first speech detector section and said third binary output led through said OR circuit serves as said voice detection output.

2. A speech detector as claimed in claim 1, wherein said first speech detector section comprises fifth means for comparing the incoming successive codes respectively with a reference digital value to deliver a fourth binary output when said incoming code shows a value exceeding said reference value, sixth means for accumulating said fourth binary output, seventh means coupled with said sixth means for delivering a fifth binary output as said output of said first speech detector section when an accumulated value at said sixth means exceeds a second threshold value.

3. A speech detector as claimed in claim 1, wherein said first means is formed of a direct connection of a sign-bit-receiving part of said input means with said second means, and wherein said second means responds only to the sign bits.

4. A speech detector as claimed in claim 2, wherein said OR circuit is coupled to the output of said second and fifth means rather than to the output of said fourth and seventh means with said sixth means coupled to the output thereof, so that said sixth and seventh means concurrently may serve as said third and fourth means, respectively.

5. A speech detector as claimed in claim 1, wherein said first means further comprises a register for successively storing said incoming parallel codes for the duration of said sampling period, and a subtractor for subtracting said stored code from said incoming parallel code.

6. A speech detector as claimed in claim 5, wherein said OR circuit is coupled to the output of said second and fifth means rather than to the output of said fourth and seventh means with said sixth means coupled to the output thereof, so that said sixth and seventh means may serve as said third and fourth means, respectively.

7. A speech detector for rapidly and reliably detecting speech signals comprising
first input means for receiving analog speech signals;
second means for periodically converting the signals applied to the said input means at a predetermined sampling rate into an n-bit binary coded signal wherein a first bit represents the polarity of the sampled signal and the remaining (n-1) bits represents the magnitude of the sampled signal; a first speech detection section for comparing the output of said second means against a predetermined threshold to generate a binary output representative of the result of the comparison operation;
a second speech detection section comprising third means for comparing selected bits of successively occurring coded signals derived from said second means to generate a binary output whose binary state represents the result of the comparison operation;
fourth means for additively or subtractively accumulating said third means outputs depending on the binary state;
means for comparing the accumulated value in said fourth means against a second predetermined threshold value to develop an output when said accumulated value exceeds a second predetermined threshold value;
means responsive to either said first or second speech detection final outputs to develop a speech detection signal.

8. The detector of claim 7 wherein said third means is adapted to compare successively occurring sign bits.

9. The detector of claim 7 wherein said third means is adapted to compare the (n-1) bits of successively occurring coded signals representing the magnitudes of said coded signals.

* * * * *